No. 793,778. PATENTED JULY 4, 1905.
A. FISCHER.
PHONOGRAPH.
APPLICATION FILED APR. 4, 1904.
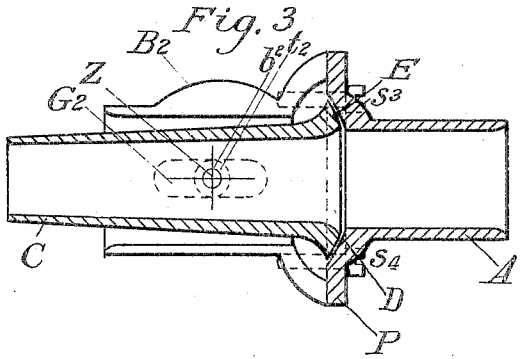
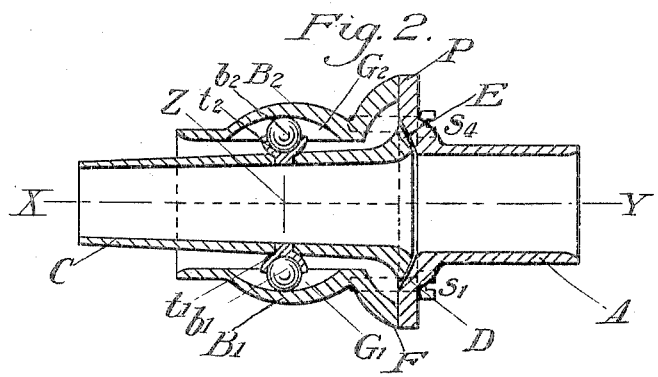
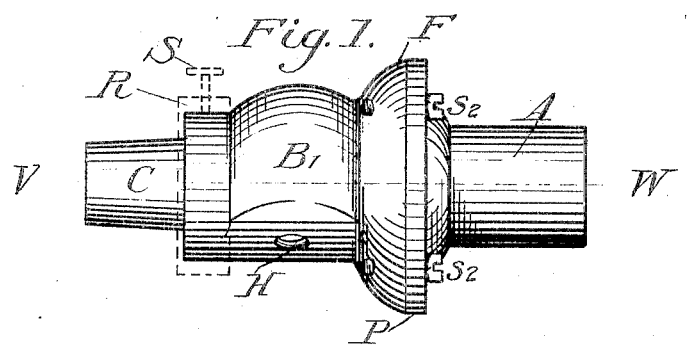
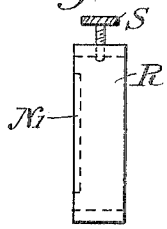
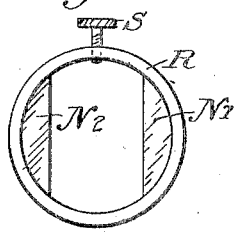
Witnesses.
Edward William Cox.
Annie Florence Reinmann.
Inventor.
ALEX FISCHER,
by Herman Gosswick Atty.

No. 793,778. Patented July 4, 1905.

UNITED STATES PATENT OFFICE.

ALEX FISCHER, OF LONDON, ENGLAND.

PHONOGRAPH.

SPECIFICATION forming part of Letters Patent No. 793,778, dated July 4, 1905.

Application filed April 4, 1904. Serial No. 201,591.

*To all whom it may concern:*

Be it known that I, ALEX FISCHER, a subject of the Emperor of Austria-Hungary, residing at 38 and 39 Bolliter Square Buildings, London, E. C., England, have invented a certain new and useful Improvement in Phonographs, of which the following is a specification, reference being had therein to the accompanying drawings.

My invention relates to improvements in movable joints used in connecting the reproducer or recorder of a phonograph to the trumpet or sounding device; and the object of my invention is to obtain a sound-proof joint which will be free from causing any secondary metallic noises when recording, such as the grating noise so frequently observed when reproducing phonographic records, and to obviate the necessity of disturbing the arrangement of the joint when changing from recording to reproducing, and vice versa, as necessitated by other constructions. I attain these objects by the mechanism illustrated in the accompanying drawings, in which—

Figure I is an outside view of the joint; Fig. II, a cross-section of the same on the line V W; Fig. III, a cross-section on the line X Y; Figs. IV and V, different views of the collar to be used when recorder is employed.

Similar letters refer to similar parts throughout the several views.

A represents the cylindrical end of the joint, to which the trumpet or sounding device may be attached by suitable means, preferably by a piece of rubber tubing.

$B'$ $B^2$ represent the outside casing of the joint, consisting of two halves held rigidly against the circular face-plate P of A by four screws $s'$ $s^2$ $s^3$ $s^4$, and which is rigidly attached to the sliding carriage of the phonograph by means of thumb-screws. H represents the socket for one of these screws.

C represents the movable trumpet-shaped part of the joint, to which the reproducer or recorder may be attached.

D is the concave rim of A; E, the convex lip of C.

F represents the flaring rim of the outer casing $B'$ $B^2$.

$G'$ $G^2$ represent grooves in $B'$ and $B^2$, respectively.

$b'$ $b^2$ represent steel balls moving in the grooves $G'$ $G^2$ and the cups provided in the ends of trunnions $t'$ $t^2$, respectively.

R represents a collar, which may be fastened on B over C when recording, by means of thumb-screw S, preventing the side motion of C by the coulisses $N'$ $N^2$, fastened to R.

Z represents the common center of the concavity of rim D and the convex lip of E, as also of the grooves $G'$ $G^2$.

The movable sound-proof joint, the object of my invention, is constructed on the general principle of a ball-and-socket joint. This joint consists of part A, to which the trumpet or sounding device may be attached in any suitable manner, rigidly connected to the casing $B'$ $B^2$ by means of screws $s'-s^4$, which again is suitably fastened to the sliding carriage of the phonograph. The moving part C of this joint consists of a trumpet-shaped tube, which within its limits may move in any direction and whose lip E is fitted closely in the hollow rim of the face-plate P of A. The outer casing consists of two equal halves $B'$ and $B^2$. Fig. III shows the cross-section of the joint with $B'$ removed. It is necessary to have the casing constructed in this manner in two parts for the proper adjustment of the ball-bearings in their corresponding grooves.

Part C is provided with trunnions $t'$ $t^2$, the ends of which are shaped as ball-sockets to receive steel balls $b'$ $b^2$, respectively, to act as bearings. These balls are adapted to move in the grooves $G'$ $G^2$, provided in the outer casing $B'$ $B^2$ and concentric both with the concavity D in face-plate P of A and the convex rim E of C, thus making a movement in any direction possible. When the apparatus is to be used for recording, an up-and-down movement alone is permissible, and the collar R is in this case slipped over the end of C and fastened on the casing $B'$ $B^2$ by means of the thumb-screw S, thus preventing a side movement of C by means of the side plates or coulisses $N'$ $N^2$, which reduce the opening of the collar to the exact outside diameter of C.

A joint constructed as above is practically sound-proof and avoids all secondary metallic sounds caused by other kinds of construction.

What I claim as my invention, and desire to secure by Letters Patent, is—

1. A tubular connection between the sound-box and horn consisting of a tubular casing, a tubular mouthpiece connected to one end thereof and having a concave inner rim, a tapering tube within said casing having a convex end engaging said concave rim, and ball-bearing devices between the tapering tube and the casing permitting universal movement of said tapering tube within said casing.

2. A tubular connection between a sound-box and horn, comprising a tubular casing, a tube within said casing having normally a universal movement therein, and a removable means on said casing having means to limit the movement of said tube to a movement in one plane.

In testimony whereof I affix my signature in presence of two witnesses.

ALEX FISCHER.

Witnesses:
EDWARD WILLIAM COX,
ANNIE F. RICHARDSON.